US007007927B2

(12) United States Patent
Halas

(10) Patent No.: US 7,007,927 B2
(45) Date of Patent: Mar. 7, 2006

(54) ARBORIST LIMB LOWERING METHOD

(76) Inventor: D. Carl Halas, 115 Cari La., Weddington, NC (US) 28014

( * ) Notice: Subject to any disclaimer, the term of this patent is extended or adjusted under 35 U.S.C. 154(b) by 0 days.

(21) Appl. No.: 10/492,042

(22) PCT Filed: Nov. 2, 2001

(86) PCT No.: PCT/US01/48181

§ 371 (c)(1),
(2), (4) Date: Apr. 6, 2004

(87) PCT Pub. No.: WO03/031287

PCT Pub. Date: Apr. 17, 2003

(65) Prior Publication Data
US 2004/0178397 A1    Sep. 16, 2004

Related U.S. Application Data

(63) Continuation of application No. 09/975,057, filed on Oct. 11, 2001, now Pat. No. 6,631,885.

(51) Int. Cl.
*B21F 9/00*    (2006.01)
(52) U.S. Cl. ............... 254/225; 254/226; 254/262; 254/389; 254/394; 254/403
(58) Field of Classification Search ........ 254/224–226, 254/262, 329, 332, 358, 389, 394, 397, 403
See application file for complete search history.

(56) References Cited

U.S. PATENT DOCUMENTS

| 482,163 | A | * | 9/1892 | Cole | 104/115 |
|---|---|---|---|---|---|
| 1,542,548 | A | * | 6/1925 | Gordon | 248/230.8 |
| 3,682,276 | A | * | 8/1972 | Krauss | 188/65.3 |
| 4,239,188 | A | * | 12/1980 | Hobbs | 254/376 |
| 4,314,693 | A | * | 2/1982 | Hobbs | 254/376 |
| 4,742,993 | A | * | 5/1988 | Montgomery et al. | 254/389 |
| D330,671 | S | * | 11/1992 | Greene et al. | D8/360 |
| 5,484,253 | A | * | 1/1996 | Johnson | 414/787 |
| 5,603,489 | A | * | 2/1997 | Regal | 254/378 |
| 5,607,143 | A | * | 3/1997 | Regal | 254/342 |
| 5,868,381 | A | * | 2/1999 | Dahlstrom | 254/415 |
| 5,971,363 | A | * | 10/1999 | Good | 254/323 |
| 6,073,917 | A | * | 6/2000 | Plummer | 254/389 |

OTHER PUBLICATIONS

Collection at a Glance; Retrieved on Oct. 8, 2001 from Internet at http://www.storrick.cnhost.com/VerticalDevicesPage/Glance.html; pp 1-13.

(Continued)

*Primary Examiner*—Emmanuel M Marcelo
(74) *Attorney, Agent, or Firm*—Tillman Ivsan, PLLC; Chad D. Tillman

(57)    ABSTRACT

An apparatus for the controlled lowering to the ground of a cut portion of a tree includes a rope and an anchor having an arrangement of guiding protuberances., each guiding protuberance including a bearing surface frictionally engaging and redirecting the rope without the rope fully encompassing any portion of the anchor including any of the guiding protuberances. Three guiding protuberances define a triangular arrangement. Of the three, a first guiding protuberance is disposed in proximity to an intermediate guiding protuberance defining a segment of a rope path therebetween, and a second guiding protuberance is disposed in proximity to the intermediate guiding protuberance defining another segment of the rope path therebetween without the segments crossing. A mounting member is attachable to the tree and a guiding member is pivotally connected to the mounting member along a pivot axis and includes an arrangement of guiding protuberances generally extending to each side thereof.

1 Claim, 10 Drawing Sheets

OTHER PUBLICATIONS

BMS Rescue Equipment; Retrieved on Oct. 8, 2001 from Internet at http://www.bmsrescue.com/nanobela.html; ppg 1-4.

BMS Belay Spool; Testing Data; Retrieved on Oct. 8, 2001 from Internet at http://www.bmsrescue.com/blayspl.htm; p. 1.

* cited by examiner

ARBORIST LIMB LOWERING METHOD

CROSS REFERENCE TO RELATED APPLICATIONS

This patent application is a continuation patent application that claims priority under 35 U.S.C.§ 120 to U.S. non-provisional patent application No. 09/975,057 of Halas titled "Arborist Limb Lowering Device and Method," filed Oct. 11, 2001, now U.S. Pat. No. 6,631,885.

FIELD OF THE PRESENT INVENTION

The present invention generally relates to the controlled lowering of a heavy object and, in particular, to the controlled lowering to the ground of a severed portion of a tree.

BACKGROUND OF THE PRESENT INVENTION

An arborist is one that is involved in the care of trees. This often involves trimming and pruning branches that are high off the ground as well as removing trees once they are dead or damaged. In addition, such trees are often in landscaped areas such that it is preferable not to allow a severed branch to drop to the ground because the falling severed portion may cause indentions in a well manicured lawn or may fall on something fragile below, such as shrubbery or anything that would be damaged by the falling weight of the severed branch. To avoid these consequences, an arborist may use ropes to lower a severed portion of the tree to the ground in a controlled manner.

Many devices are known that facilitate the lowering of a severed portion of a tree to the ground. Such devices, for example, are disclosed in U.S. Pat. Nos. 4,239,188; 5,971, 363; 5,484,253; and Des. 330,671. Except for the tree pulley of U.S. Pat. No. Des. 330,671, all of the disclosed devices provide for and/or require the wrapping of a lowering rope multiple times around a portion of the device for sufficient frictional support of the severed portion of the tree for controlled lowering of thereof, especially when the severed portion of the tree is heavy. This is unfortunate, because it is believed that every complete wrapping of the lowering line around a portion of the device creates a twist in the line, which decreases the useful life of the line and limits the number of times the line may be used to lower portions of trees to the ground. Furthermore, the wrapping of the lowering line creates a tendency in the lowering line to twist and to knot, which creates a hazard during lowering operations. A twisting or knotting of the lowering line may jam a device through which the lowering line passes. An unobservant operator quickly passing the lowering line through his hands also may be unexpectedly thrown off balance or injured when a knot suddenly is encountered.

Accordingly, a need exists for a device for lowering a severed portion of a tree to the ground that does not require the creation of twists in the lowering line for controlled lowering of the severed portion of the tree.

SUMMARY OF THE PRESENT INVENTION

Briefly described, the present invention relates to an apparatus and method for lowering a severed portion of a tree to the ground. In a first aspect of the present invention, the apparatus includes a rope and a device comprising an anchor having an arrangement of guiding protuberances. Three of the guiding protuberances define a triangular arrangement. Each of the guiding protuberance includes a bearing surface frictionally engaging and redirecting the rope without the rope fully encompassing any portion of the anchor, including any of the guiding protuberances. No twist thereby is created in the rope in the controlled lowering of the severed portion of the tree to the ground.

In a feature of the anchor, two rows of guiding protuberances are provided with each row including a plurality of guiding protuberances, with adjacent guiding protuberances in each row extending from the anchor in generally parallel relation to the other. In another feature, the anchor includes a first member secured in engagement with a lower portion of the tree against movement relative thereto, and a second member pivotally connected to the first member along a pivot axis and including thereon the guiding protuberances. In another feature, the anchor includes a braking pin extending at an acute angle to a surface of said anchor such that a gradually diminishing spacing is defined. A portion of the rope then may be extended through and wedged therebetween against movement relative to the guiding protuberances.

In another aspect of the present invention, the apparatus includes a device comprising an anchor having an arrangement of guiding protuberances with each guiding protuberance including a bearing surface for frictional engagement with and redirection of a rope around an axis thereof. In particular, a first guiding protuberance is disposed in proximity to an intermediate guiding protuberance defining a segment of a rope path therebetween, and a second guiding protuberance is disposed in proximity to the intermediate guiding protuberance defining another segment of the rope path therebetween without the segments crossing. The axis of the first, second, and intermediate guiding protuberances are generally non planar (i.e., do not extend within a plane common to all three axis). In features of this aspect, each segment extending between the bearing surfaces of the guiding protuberances generally is linear; the guiding protuberances extend from the anchor in generally parallel relation to each other; the axis of the first, second and intermediate guiding protuberances extend in parallel relation to one other; the bearing surfaces of the guiding protuberances generally are disposed in alignment with one another such that the segments generally are coplanar.

In another aspect of the present invention, an apparatus for the controlled lowering to the ground of a freshly cut upper portion of a tree includes a mounting member attachable to the tree; and a guiding member pivotally connected to the mounting member along a pivot axis and including an arrangement of guiding protuberances generally extending to one side thereof, with each guiding protuberance having a bearing surface for frictional engagement with and redirection of a rope. In a feature of this aspect, the guiding member includes a second arrangement of guiding protuberances extending to another side thereof Preferably in this aspect, the guiding member includes oppositely facing planar surfaces generally parallel to the pivot axis, with the protuberances of the first arrangement extending from the first planar surface and the protuberances of the second arrangement extending from the second planar surface. Furthermore, the first arrangement of protuberances preferably is a mirror image of the second arrangement of protuberances, the protuberances extend generally orthogonal to the pivot axis; the protuberances have differing cross-sectional areas; and the arrangement comprises an array of protuberances including rows and columns. The columns of protuberances also preferably are offset to one another.

In additional features of these aspects of the present invention, the guiding protuberances include rollers and the anchor includes a winch for controlled rotation of the rollers. Alternatively, the rollers include sprockets, and a chain operatively connects the rollers with the winch for controlled rotation. A motor may be included for operation of the winch. In another feature of these aspects, the device further includes an arm attached to and extending away from the anchor, with the arm including a distal end having a guiding surface for guidance of the rope away from the anchor. In this regard, a pulley is secured on the distal end of the arm—the pulley including the guiding surface. Also, the arm may be telescopic. In other features of these aspects of the present invention, the guiding protuberances each have generally circular cross-sections, and the circular cross-sections have different cross-sectional areas. Additionally, each guiding protuberance includes an end configured to bar slippage of the rope out of engagement with the bearing surface thereof. The end may include a pin mounted thereon and extending beyond opposite sides of the guiding protuberance or a flange.

Also in accordance with the present invention, a method of lowering to the ground a first portion of a tree includes the steps of securing one end of a rope to the first portion of the tree; securing an anchor against movement relative to another portion of the tree; guiding an intermediate length of the rope around each one of a triangular arrangement of guiding protuberances of the anchor for support of the first portion of the tree once severed, each guiding protuberance including a bearing surface frictionally engaging and redirecting the rope without the rope fully encompassing any portion of the anchor including any of the guiding protuberances; severing the first portion of the tree; and controlling movement of the rope past the guiding protuberances.

In features of this aspect of the present invention, the method further includes the steps of not twisting the rope during the step of guiding the intermediate length of the rope around the guiding protuberances; restraining the rope against movement relative to the guiding protuberances by wedging the rope between a surface of the anchor and a braking protuberance that extends from the surface of the anchor at an acute angle; guiding the rope near to the ground with a pulley attached to an arm extending downwardly away from the anchor.

In yet an additional feature of this aspect, the method further includes independently lowering an additional portion of the tree by securing one end of another rope to the additional portion of the tree; guiding an intermediate portion of the other rope around each one of a second arrangement of guiding protuberances for support of the additional portion of the tree once severed, each guiding protuberance including a bearing surface frictionally engaging and redirecting the other rope without the rope fully encompassing any portion of the anchor including any of the guiding protuberances; severing the additional portion of the tree; and controlling movement of the other rope past the guiding protuberances. In this case, the first arrangement and second arrangement of guiding protuberances are part of the same device.

In a preferred embodiment of the device of the present invention, a plurality of cylindrical protuberances for distributing frictional resistance to the lowering line are disposed parallel to one another and extend from and are attached to a planar distribution plate. The planar plate is attached to a base plate, which may be curved to conform to the curved outer surface of a tree trunk, or any object to which the lowering device may be attached during operation. The protuberances provide a route for a lowering line to pass through, with the end of the lowering line extending out of the device, thereby allowing an operator to be positioned away from the device, even when the device is attached to a tree trunk. The protuberances are strategically arranged on the planar plate so that the lowering line frictionally slides along the surfaces of the protuberances, but without fully wrapping around any particular protuberance. Advantageously, the line is prevented from the twisting that occurs when a lowering line is wrapped completely at least once around an object. Each protuberance progressively adds friction to the line as it passes through the device, without the line being fixed to the device. Since the line is not fixed to the device, the line can pass through the device and can be manually regulated by an operator at the unattached end of the line.

Additionally, in a preferred embodiment of the device, the planar plate is hingedly attached to the base plate so that the lowering line can exit from the device over a range up to approximately 180 degrees. This provides the operator with a range of options with respect to the location of the operating while operating the device. The device also includes a retaining pin or flange at the end of the protuberance to prevent the lowering line from slipping off the end of a given protuberance as the line frictionally slides through the device. This is especially helpful when the planar plate is oriented to either the right or left of perpendicular with respect to the base plate.

In another preferred embodiment, a series of sprockets and chain or gears are provided in a winch mechanism to facilitate the controlled lowering of the severed portion of the tree or for raising heavy objects, such as a chainsaw or other cutting tool. The sprockets or gears are attached to the protuberance, which are designed to rotate freely in apertures, which are designed to receive the protuberance tubes in the distribution block. The ratios of the gears or sprockets may be selected to allow a mechanical advantage for raising the object while at the same time providing resistance to the weight being raised, so that if the operator releases the winch, the weight of the object being raised will not cause it to fall. This feature can also be achieved with the use of a pawl or similar device known in the art.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein.

DETAILED DESCRIPTION OF PREFERRED EMBODIMENTS

As a preliminary matter, it will readily be understood by those persons skilled in the art that the present invention is susceptible of broad utility and application in view of the following detailed description of the preferred devices and methods of the present invention. Many devices, methods, embodiments, and adaptations of the present invention other than those herein described, as well as many variations, modifications, and equivalent arrangements, will be apparent from or reasonably suggested by the present invention and the following detailed description thereof, without departing from the substance or scope of the present invention. Accordingly, while the present invention is described herein in detail in relation to preferred devices, methods and systems, it is to be understood that this disclosure is illustrative and exemplary and is made merely for purposes of providing a full and enabling disclosure of the preferred embodiments of the invention. The disclosure herein is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
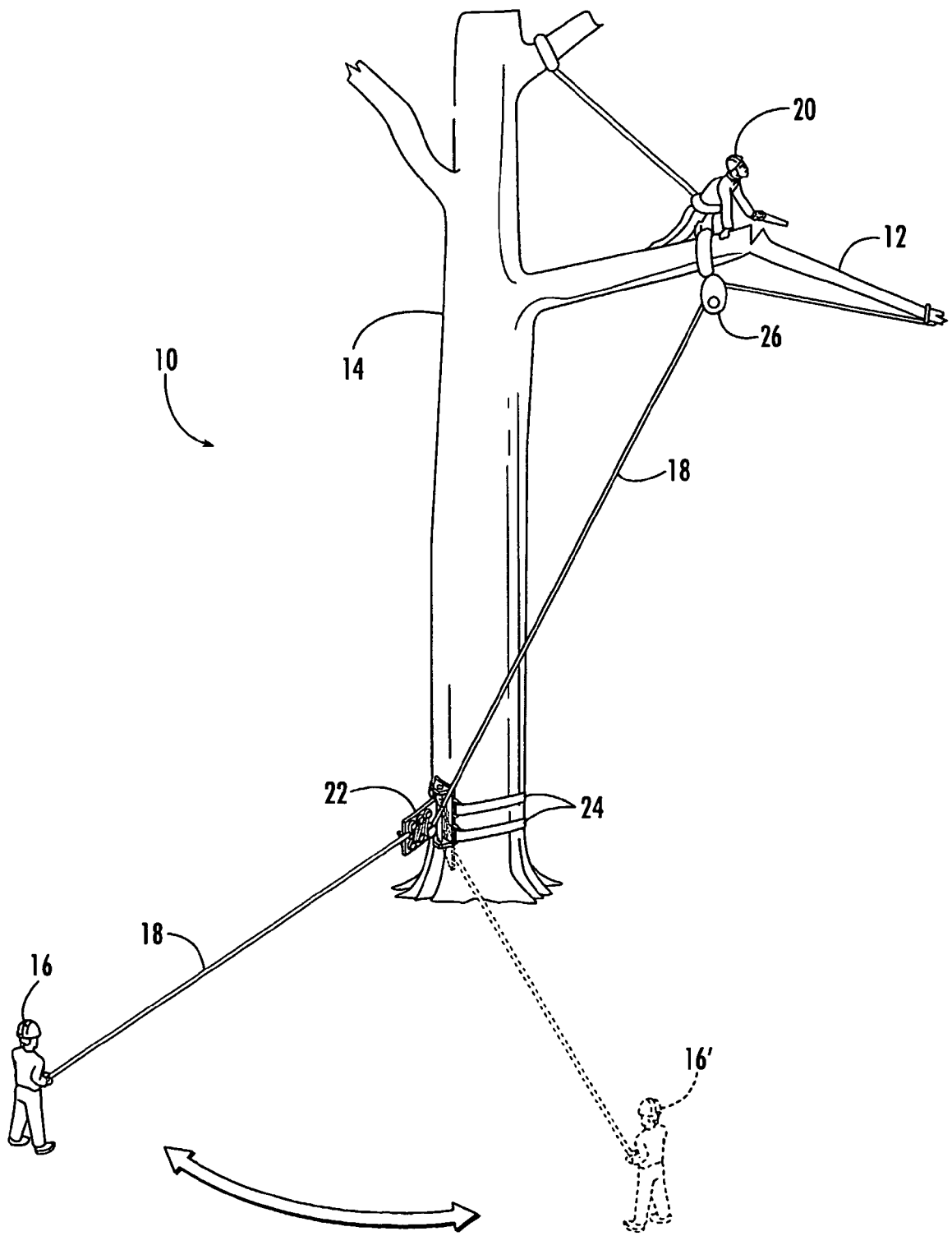
FIG. 1 illustrates a system of the present invention for lowering a severed portion of a tree to the ground.

Turning now to FIG. 1, a system 10 is illustrated for lowering a severed portion 12 of a tree 14 to the ground. A ground worker 16 manipulates a lowering line 18 in the form of a rope, which has been placed in tree 14 and attached to severed portion 12 by climber 20 in order to lower the portion 12 of the tree in a controlled manner after cutting. In addition to the lowering line 18, the system 10 includes an anchor 22 that is secured to the tree 14 by support straps 24 and an aerial pulley 26 to support the weight of the severed portion 12 as it is lowered. The anchor 22 is typically placed at an elevation above the ground such that the lowering line 18 extending between the anchor 22 and the ground worker 16 is approximately parallel with the ground as the ground worker 16 manipulates the lowering line 18.

The system 10 advantageously facilitates, for example, slowly lowering of the severed portion 12 so as to prevent gouging of the earth underneath. System 10 also allows the ground worker 16 to stand in various positions relative to the anchor 22 so that the severed portion 12 will not be directly overhead. This advantage is illustrated by the ground worker 16' shown in the dashed lines of FIG. 1. In this regard, a hinged plate on the anchor 22 facilitates this movement and will be discussed in greater detail below.

Figure 2:
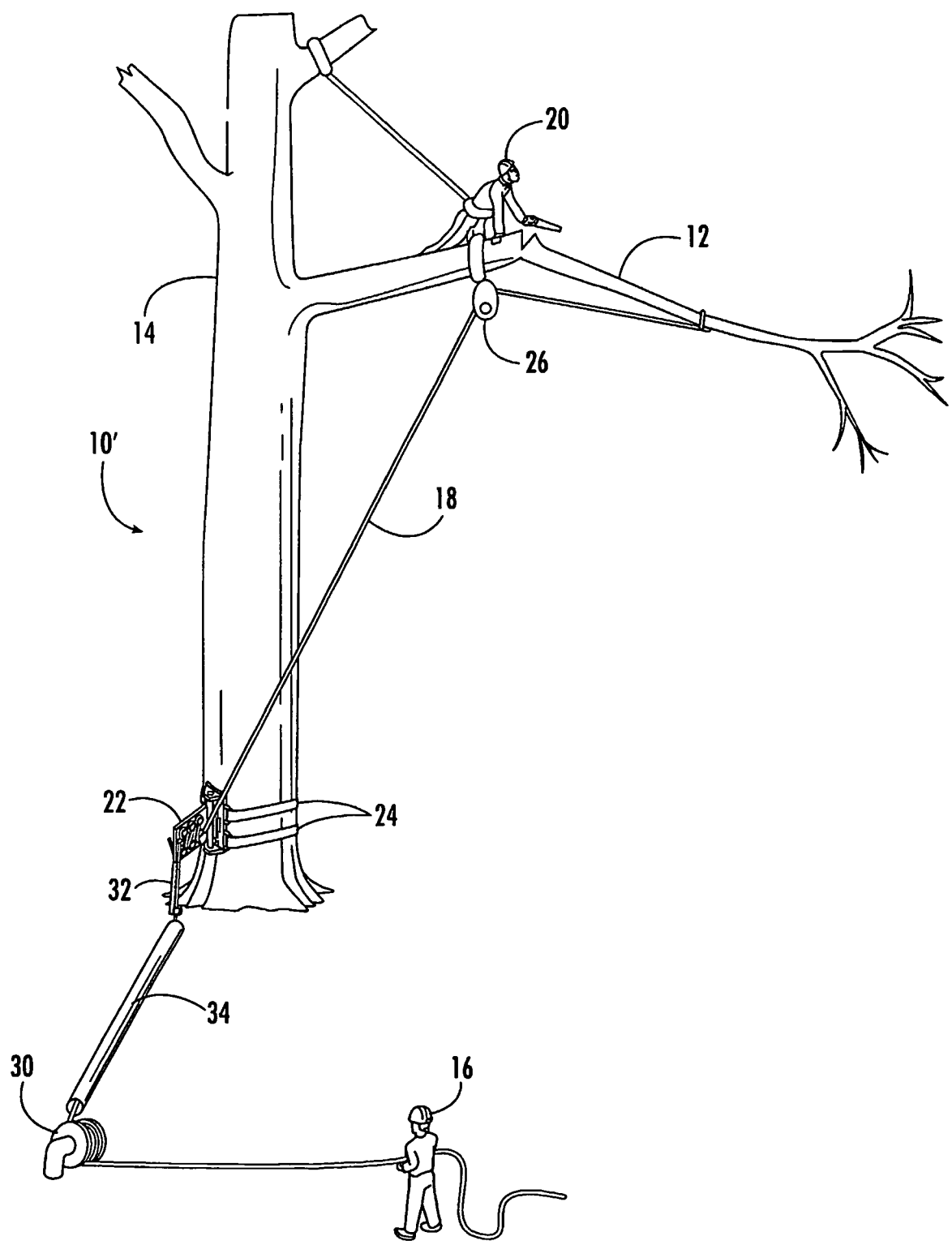
FIG. 2 illustrates a variation in the system of FIG. 1 for lowering a severed portion of a tree to the ground.

Turning now to FIG. 2, an alternative system 10' is shown in which an extension bracket 32 is used to place the length of lowering line 18 exiting from the anchor 22 within a few inches from the ground, and preferably less than a foot from the ground. This reduces the likelihood that the lowering line 18 will become entangled with branches or leaves, for example, as the severed portion 12 of the tree 14 is lowered. Preferably the extension arm 32 is telescopic so that its length from the anchor 22 is adjustable. In system 10', a ground pulley 30 also is used to maintain the lowering line 18 close to the ground and may be secured to the ground with a stake or weight. Moreover, the ground pulley 30 is secured at a height above the ground such that the lowering line 18 travels along the bottom side of the pulley 30 at approximately the same distance above the ground as that extending between the distal end of the extension bracket 32 and the ground. Thus, the span of lowering line 18 extending between the extension bracket 32 and the bottom side of the ground pulley 30 is substantially parallel to the ground.

Optionally, an extension tube 34 may be used to sheath the portion of the lowering line 18 extending between the extension bracket 32 and the bottom side of the ground pulley 30, and prevents the severed portion 12 of the tree 14 from becoming entangled with the lowering line 18 as it is lowered. Extension tube 34 may be made of any convenient material and, preferably, extension tube 34 is made from an appropriate length of a lightweight material such as PVC, for example, and includes a diameter appropriate to accommodate the thickness of the lowering line 18 being used.

Figure 3:
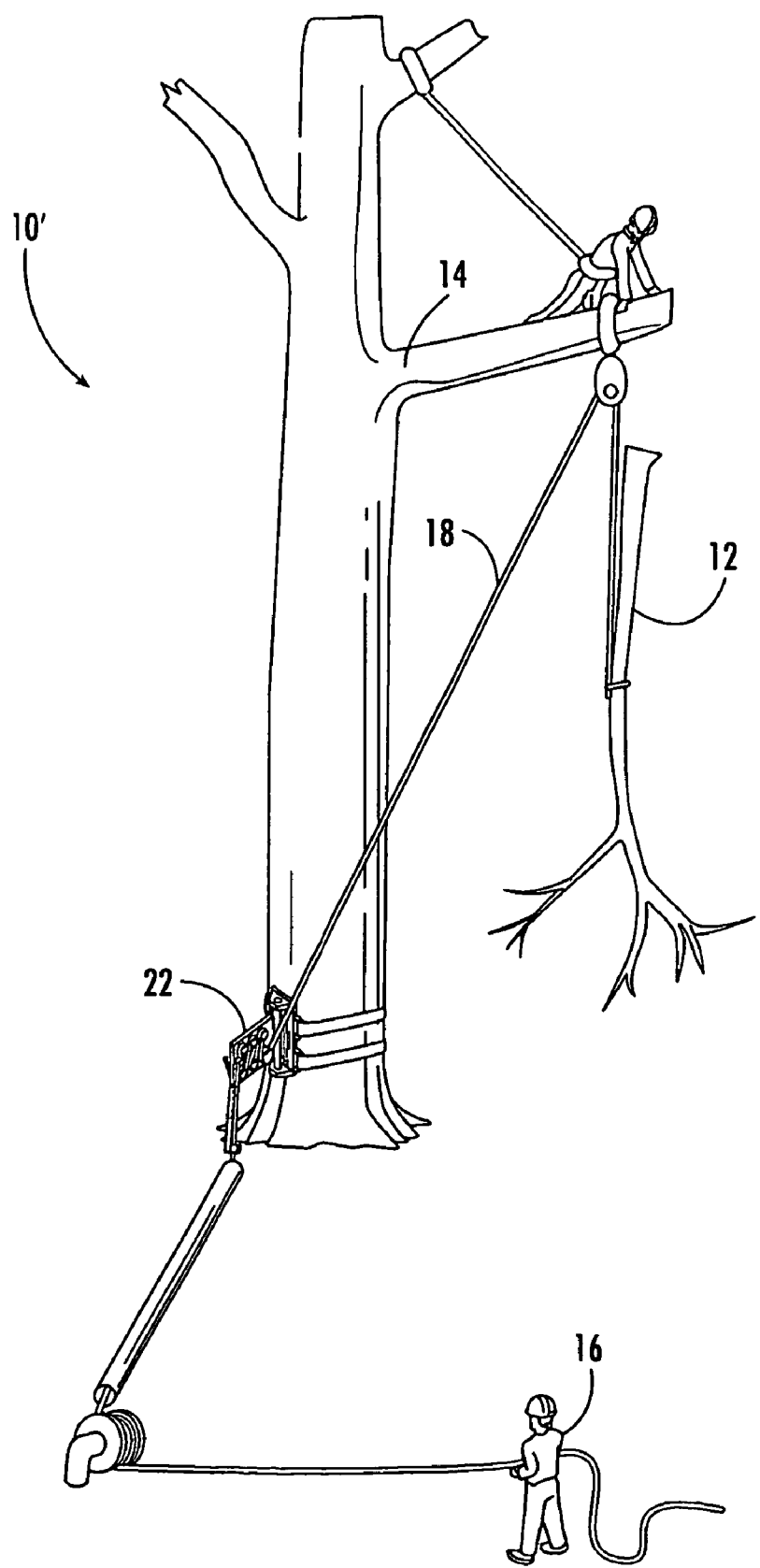
FIG. 3 illustrates another view of the system of FIG. 2.

Turning now to FIG. 3, the system 10' of FIG. 2 is illustrated as the severed portion 12 is lowered to the ground. After the severed portion 12 is completely severed from the tree 14, the ground worker 16 allows the lowering line 18 to pass through the ground worker's hands by relaxing the grip on the lowering line 18. The anchor 22 provides resistance to the downward force on the lowering line 18 that arises from the weight of the severed portion 12 being lowered. This allows the ground worker 16 to control the rate of descent of the severed portion 12 without having to exert a force equal to the weight of the severed portion 12 as it is lowered and, therefore, provides a controlled lowering of the severed portion 12.

Figure 4:
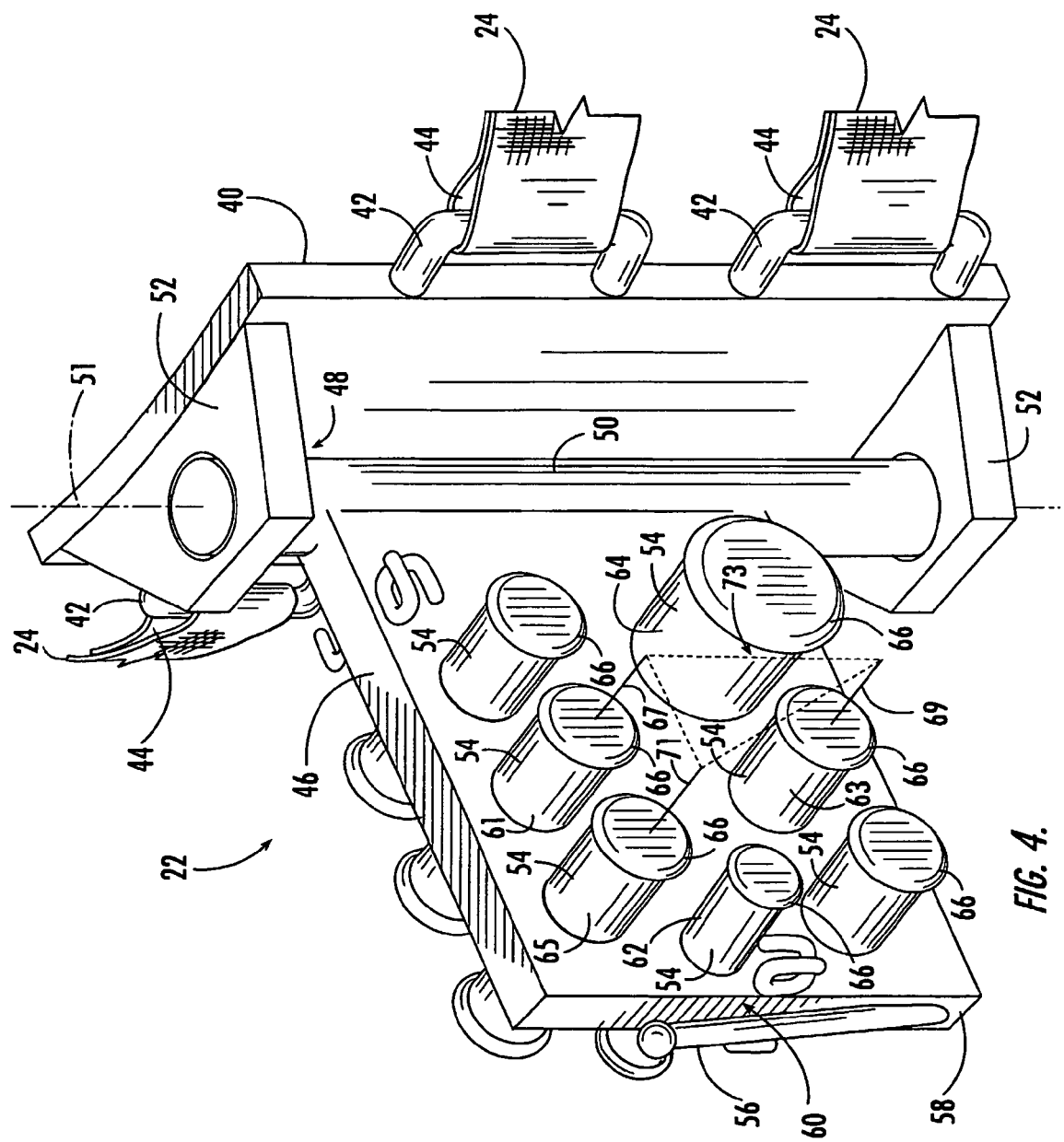
FIG. 4 illustrates an isometric view of an anchor of the system of the present invention for lowering a severed portion of a tree to the ground.

Turning now to FIG. 4, a detailed view of an anchor 22 is illustrated. The anchor 22 includes a support plate 40, which contacts the trunk of a tree 14 and forms the base of the anchor 22. Attached to the support plate 40 are four strap hooks 42, which are welded to the support plate 40. Support straps 24 attached to the hooks 42, are made, for example, from nylon webbing, and include turnbuckles, ratchets, or other fastening means known to those skilled in the art. The support straps 24 also include loops 44 woven into the ends of the straps and placed about the hooks 42 before the hooks 42 are welded to the support plate 40. Alternatively, the loops 44 are formed after the hooks 42 are welded to the support plate 40, and fastened about the hooks 42 either with rivets or other fastening means known to those skilled in the art.

Additionally, anchor 22 includes a distribution plate 46, which is attached to the support plate 40 with a hinge mechanism 48. The hinge mechanism 48 includes a shaft 50 that extends between and is retained by hinge supports 52 for pivotal movement about an axis 51. The hinge supports 52 are fixedly secured to the support plate 40. The hinge mechanism 48 allows the distribution plate 46 to pivot about the axis 51 when the support plate 40 is securely attached to a tree against movement.

The anchor 22 also includes a plurality of protuberances 54 that extend or protrude from the distribution plate 46. The protuberances 54 are preferably welded to the distribution plate 46, but may be rigidly secured to the distribution plate 46 in any conventional manner. To prevent a lowering line 18 from slipping off any of the protuberances 54, each of the protuberances 54 includes a retention lip or flange 66 at the end thereof. The anchor 22 also includes an attached binding pin 56 that functions as a braking mechanism on a lowering line as a severed portion of a tree is being lowered. The binding pin 56 is angled with respect to the surface—preferably the end edge 58—of the distribution plate 46 to which it is attached.

In accordance with the present invention, the protuberances 54 are arranged in an advantageous pattern such that, when a lowering line is routed through the plurality of protuberances 54, friction between the lowering line and protuberances 54 is produced that resists the weight of the severed portioned of the tree as it is lowered. In particular, the protuberances 54 are preferably arranged in two parallel rows, with each row preferably comprising more than one of the protuberances 54. One of the rows includes a receiving protuberance 64 having a larger cross-section than the other protuberances. The arrangement of protuberances 54 also includes a single exit protuberance 62 disposed at a location between the two rows of the other protuberances. The protuberances 54 may be attached to the distribution plate 46 so that they extend from only one side of the distribution plate 46, or they may be attached such that they extend from both sides of the distribution plate 46.

With particular regard to receiving protuberance 64 it should be noted that the larger circumferential area—and less curvature—of receiving protuberance 64 provides a greater bearing surface and, hence, greater friction with a lowering redirected therearound. Thus, by providing a larger circumferential area and decreasing the curvature of the receiving protuberance 64 the force of the severed portion is better countered by the first protuberance.

A unique characteristic of the arrangement of protuberances 54 of anchor 22 is that several groups of three protuberances each form a respective triangular arrangement. For example, a first protuberance 61, second protuberance 63, and intermediate protuberance 65 each include a respective axis 67,69,71 that extends generally in non planar, parallel relation to the others. This group of three protuberances defines a triangular arrangement 73 as illustrated by the dashed lines extending between the axis 67,69,71 in FIG. 4.

Figure 5:
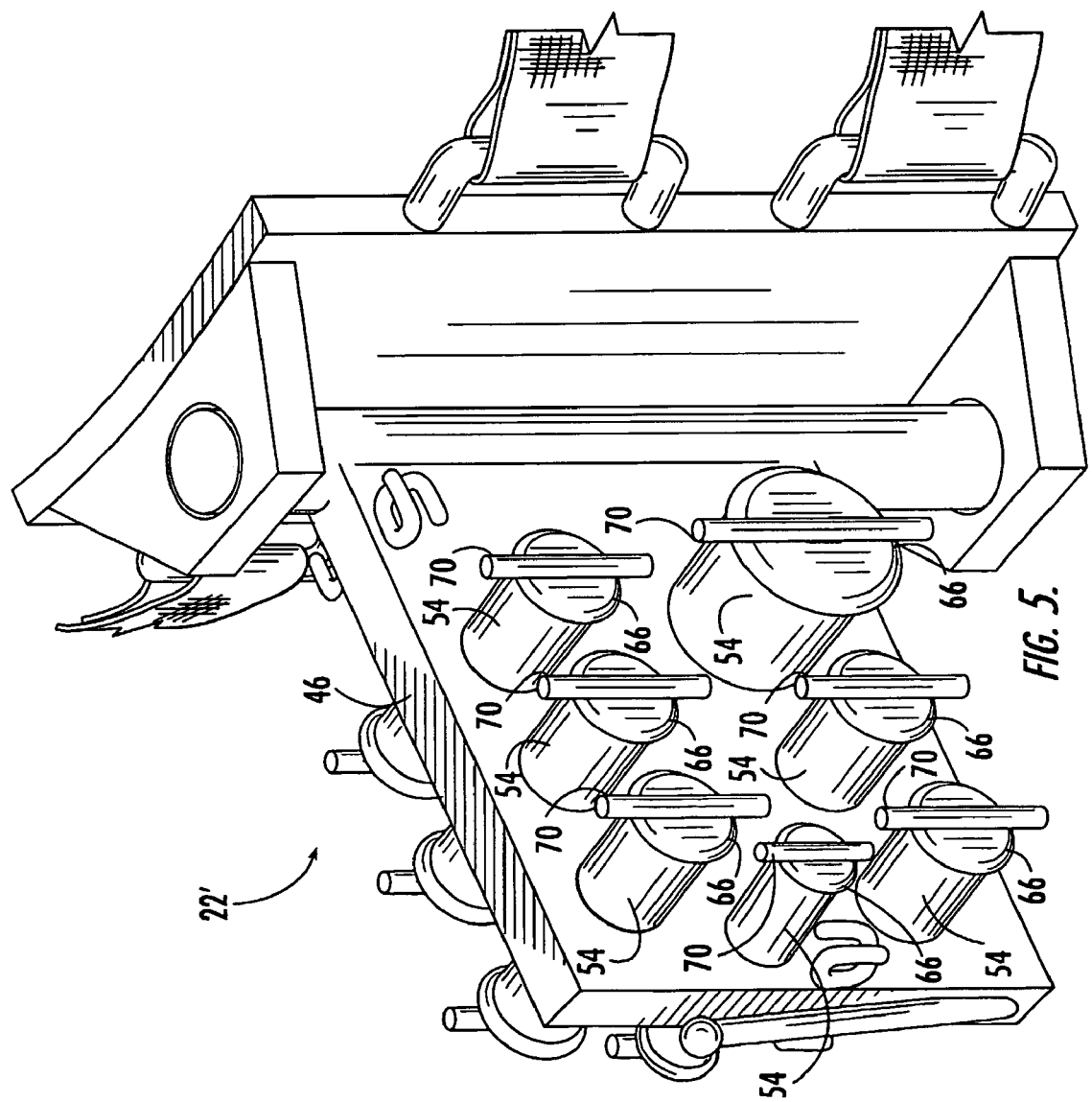
FIG. 5 illustrates an isometric view of an alternative anchor of the system of the present invention for lowering a severed portion of a tree to the ground.

An alternative embodiment is illustrated in FIG. 5, wherein anchor 22' is substantially the same as anchor 22 of FIG. 4 but for the addition of retention pins 70 attached to the ends of the protuberances 54. The length of each retention pin 70 is greater than the diameter of the protuberance 54 to which it is attached so as to extend beyond the end of the protuberance 54 to either side thereof. In conjunction with flanges 66, the retention pins 70 further prevent a lowering line from slipping off of the protuberances 54.

In accordance with the present invention, a lowering line never fully wraps around any one of the plurality of protuberances when an anchor of the present invention is used. Accordingly, routing of a lowering line through the plurality of protuberances advantageously prevents twisting of the lowering line while at the same time provides resistance to the weight of the severed portion of the tree being lowered.

Figure 6:
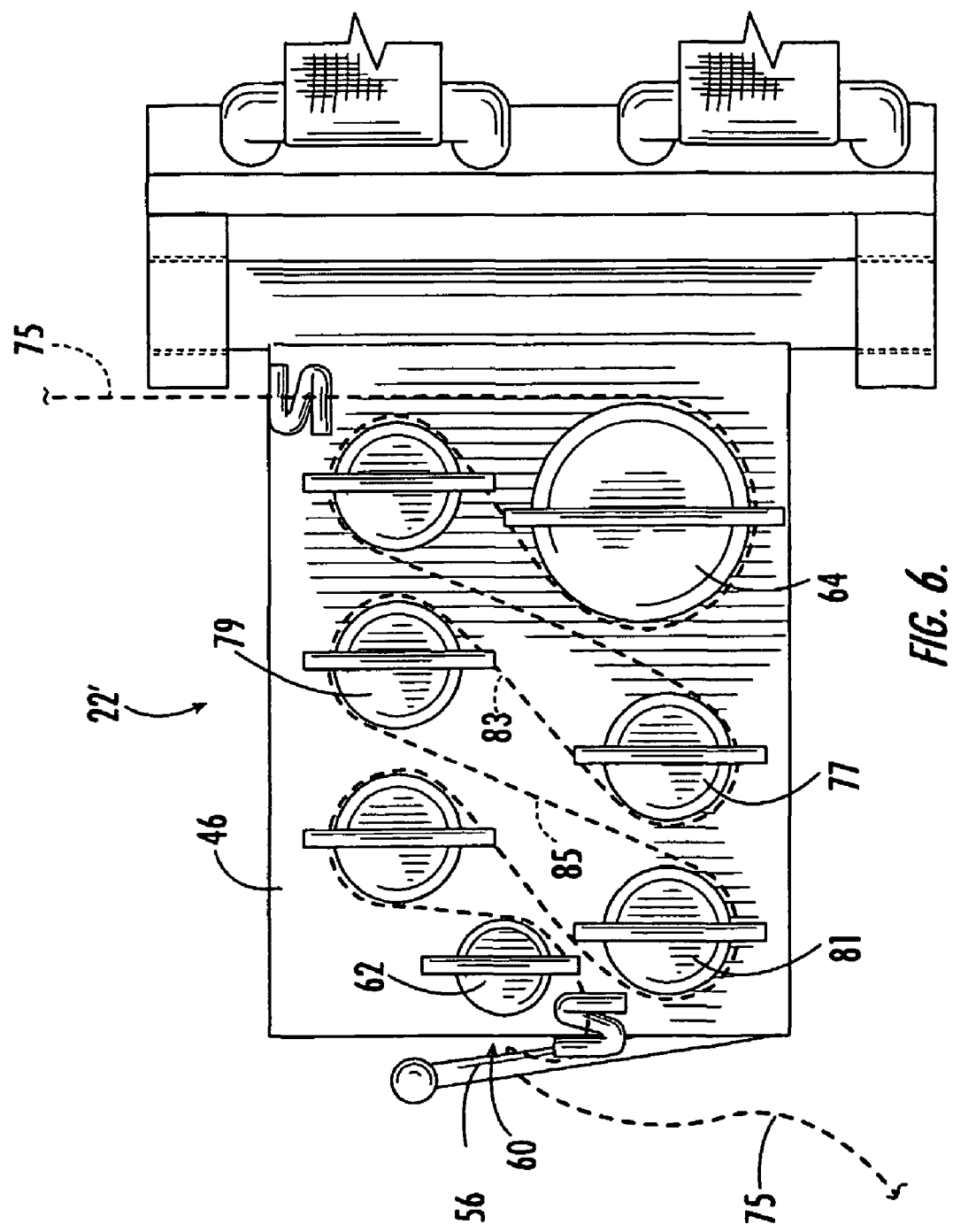
FIG. 6 illustrates an elevational view of a side of the anchor of FIG. 5.

As shown by the dashed lines in FIG. 6, a lowering line 75 is advantageously routed through the protuberances and contacts any given protuberance along an arc that is less than 360 degrees. As is evident, a preferred travel path of the lowering line 75 does not fully encompass, i.e., completely wrap around more that 360 degrees, any particular protuberance. For instance, a first guiding protuberance 77 is disposed in proximity to an intermediate guiding protuberance 79 defining a segment 83 of a rope path therebetween, and a second guiding protuberance 81 is disposed in proximity to the intermediate guiding protuberance 79 defining another segment 85 of the rope path therebetween without the segments 83,85 crossing. In features of this aspect, each segment 83,85 extending between the bearing surfaces of the guiding protuberances 77,79 and 79,81 generally is linear; the guiding protuberances 77,79,81 extend from the base plate 46 in generally parallel relation to each other; the bearing surfaces of the guiding protuberances 77,79,81 generally are disposed in alignment with one another such that the segments 83,85 generally are coplanar; and the first, second, and intermediate guiding protuberances 77,79,81 are not generally collinear.

The travel path of the lowering line 75 may or may not frictionally engage each protuberance 54, depending upon the magnitude of the weight of the portion being lowered.

FIG. 6 also servers to illustrate that the receiving protuberance 64 is preferably of larger diameter than the other protuberances 54, and that the exit protuberance 62 is slightly smaller in diameter than the other protuberances 54. This configuration is preferable because the larger radius of the receiving protuberance 64 bears the brunt of the load on the lowering line as it is the first protuberance that frictionally engages the lowering line. Conversely, the lowering line does not have to be routed around exit protuberance 62 such that the protuberance contributes significantly to the friction on the lowering line. In addition, the exit protuberance 62 may be positioned relative to the binding pin 56, and more particularly to the convergence 60, so as to place the lowering line's exit to facilitate binding of the lowering line in the convergence 60.

Finally, as shown in FIG. 6, braking resistance to the weight of the portion of the tree being lowered may be provided by wedging the lowering line 75 between the distribution plate 46 and the binding pin 56 within the gradually diminishing convergence 60. If the downward force on the lowering line towards the convergence 60 is sufficient to drive the lowering line deep into the convergence 60, then the resistance provided thereby should be sufficient to completely halt the lowering of the severed portion. The binding pin 56 thus provides a means for a ground worker to apply a relatively small force on the lowering line to regulate the descent of the severed portion as well as to hold the severed portion at a constant height when desired.

Figure 7:
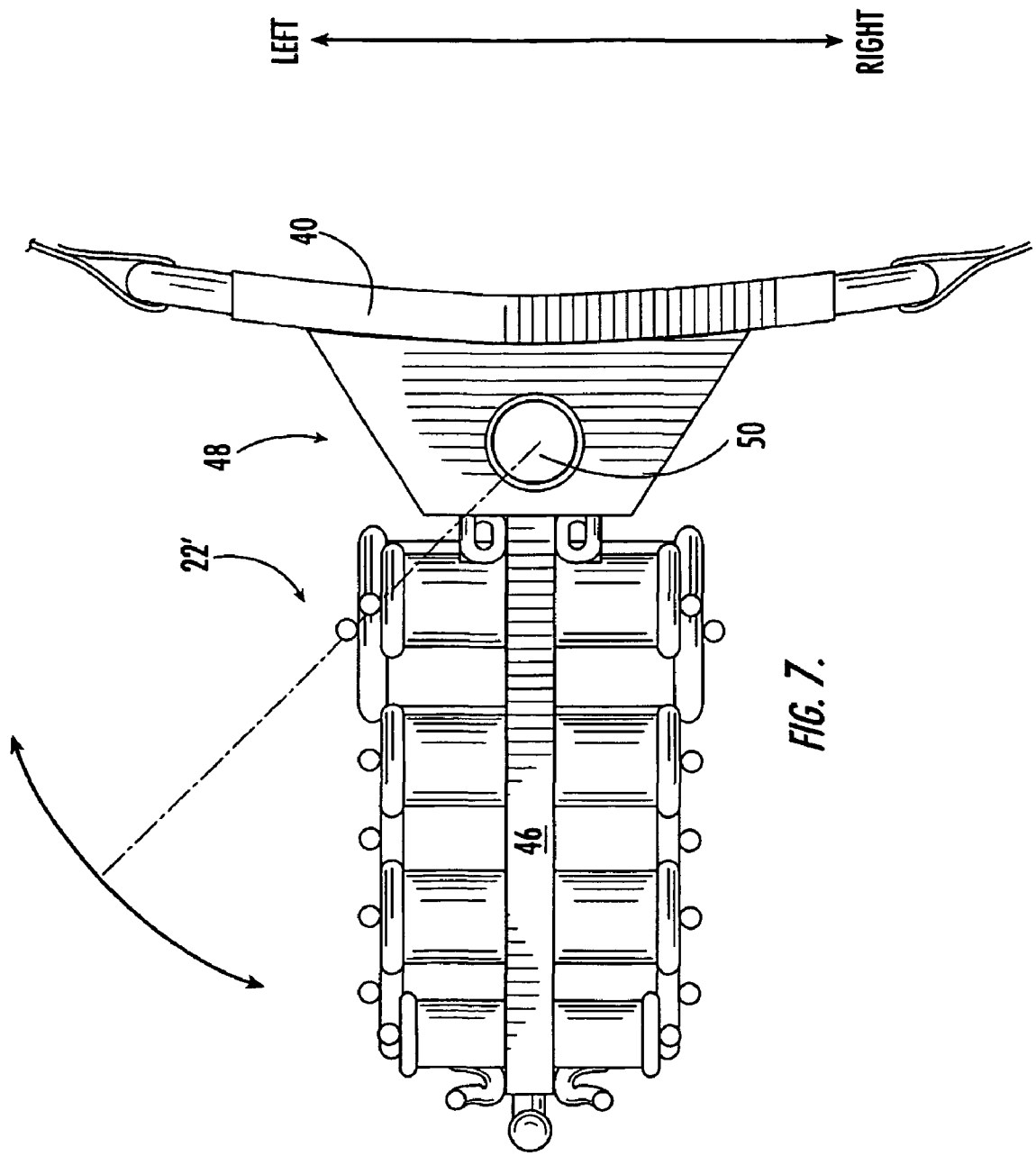
FIG. 7 illustrates a plan view of the anchor of FIG. 5.

Turning now to FIG. 7, a plan view of the anchor 22 best illustrates the provision of an arrangement of protuberances to each planar side of the distribution plate 46. In the anchor 22' of FIG. 7, the arrangement on each planar side is a mirror image of the other about a plane of the distribution plate 46. Subsequently, if a lowering line being used to lower a severed portion of a tree were to the left side of the anchor 22', the line would be routed through the arrangement of protuberances on the left side of the anchor 22'. Likewise, if the severed portion were to the right side of the anchor 22', then the lowering line would be routed through the arrangement of protuberances on the right side of the anchor 22'. This prevents the interference and chafing of the lowering line with the distribution plate 46 that would otherwise occur. This also allows a separate and independent lowering line to be routed through the arrangement of protuberances on either side of the distribution plate 46 in order to accommodate independent operations.

The plan view of FIG. 7 also illustrates how the distribution plate 46 of anchor 22' pivots about the hinge 50 of hinge mechanism 48 to facilitate alignment of the protuberances 54 with a lowering line. Due to irregularities in the truck to which the anchor 22' is to be mounted, the placement of the base plate 40 may not always be ideal. The wide range of pivotal motion of the base plate 46 about hinge 50 compensates for such realities. Moreover, the range of motion of the distribution plate 46 about hinge 50 allows a ground worker to be located at various angular locations about a tree trunk.

Figure 8:
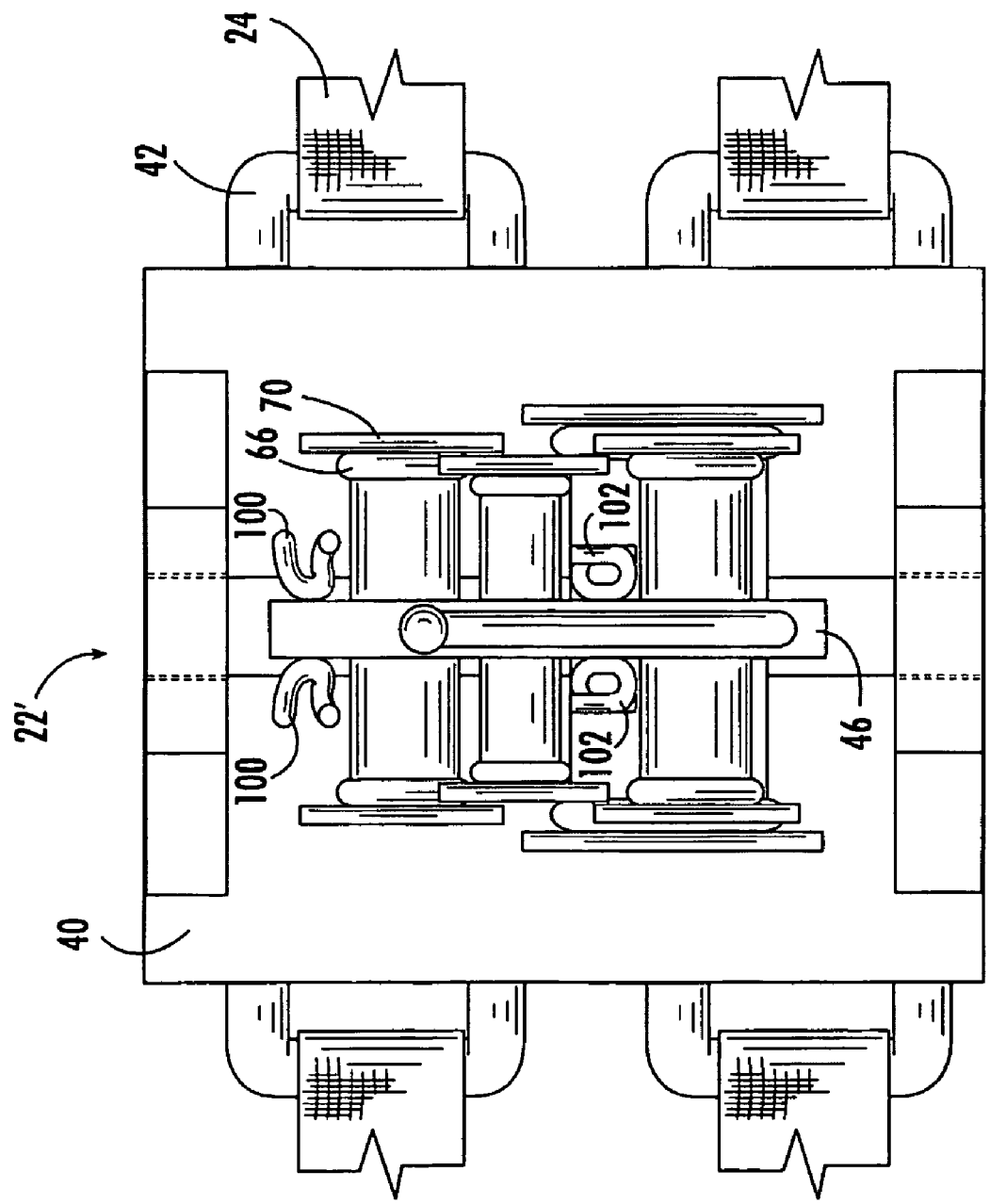
FIG. 8 illustrates an elevational view of the front of the anchor of FIG. 5.

An elevational view of the front of the anchor 22' is shown in FIG. 8 and best illustrates entrance guides 100 and exits guides 102 to be found in illustrated anchors of the present invention. Both the guides 100 and exits guides 102 are fixedly secured to the distribution plate 46 and are disposed in close proximity to the distribution plate 46 relative to the ends of the protuberances. The lowering line preferably is routed first through an entrance guide 100, then around selected protuberances, and then exits from the anchor 22' by being routed through a corresponding exit guide 102. Because of their disposition close to the distribution plate 46, the entrance and exit guides 100,102 assist in keeping the lowering line close to the distribution plate and assist the flanges 66 and retention pins 70 in keeping the lowering line from slipping off the ends of the protuberances.

Figure 9:
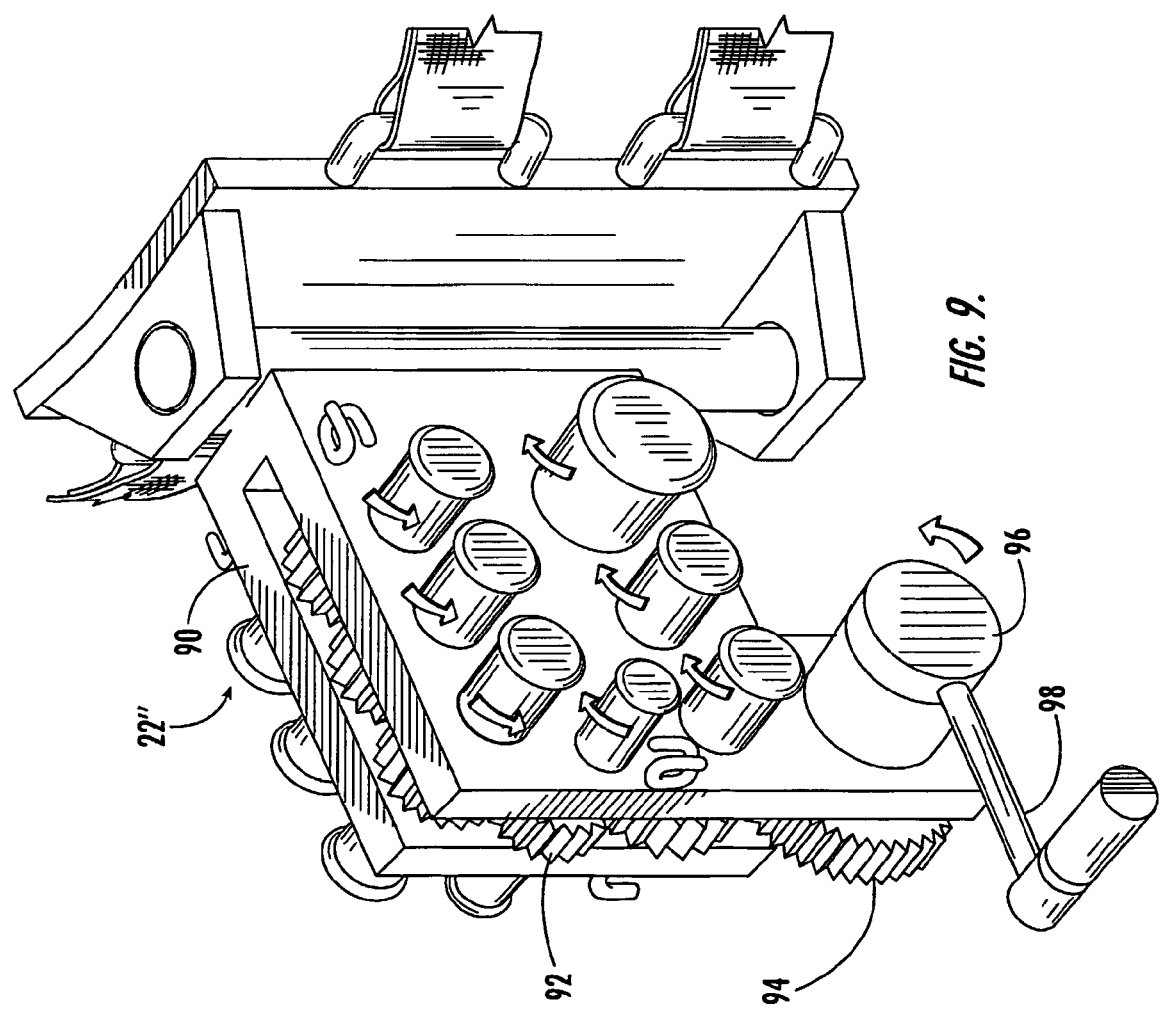
FIG. 9 illustrates an isometric view of another alternative anchor of the system of the present invention for lowering a severed portion of a tree to the ground.

Another anchor 22" of the present invention is shown in FIG. 9, wherein the anchor 22" is configured such that a severed portion easily can be lowered or raised by a ground worker or a climber. The anchor 22" includes a distribution block 90 that is preferably fashioned from a section of steel channel stock and that is configured such that the protuberances are not rigidly attached to the distribution block 90. Rather, as shown by arrows in FIG. 9, the protuberances pass through the distribution block 90 such that the protuberances 54 are rotatable with respect to the distribution block 90. In this respect, the rigid tubes forming the protuberances 54 engage with protuberance gears 92 disposed within the channel, wherein each gear is concentrically attached in a rigid fashion around each of the protuberances. The gears 92 are driven by winch gear 94, which is in turn motivated by winch hub 96. Winch hub 96 may preferably be driven manually by winch handle 98, or alternatively, by an attached engine or motor (not shown).

The protuberance gears 94 and winch gears 92 work together to regulate the lowering of a severed portion. However, instead of a lowering line frictionally sliding through the protuberances the coefficient of friction between the protuberances and the lowering line is sufficient to preclude slippage therebetween. This may be achieved through careful selection of line material and provision of splines in the protuberances, for example, such that the protuberances roll with the lowering line without the lowering line sliding relative thereto as the tree portion is lowered. The anchor 22" preferably will have an overall gear reduction ratio that allows a ground worker or a climber to easily crank the winch handle 98 to raise or lower a severed portion, or other object such as a chainsaw or similar cutting tool, that otherwise would be difficult to lower (or raise) in a controlled manner with any of the anchors of FIGS. 4–8.

The anchor 22" also may include a pawl or other similar device (not shown) for preventing the weight of the object being lowered from causing the winch handle to spin, thereby allowing the object to fall. Thus, the pawl or other device acts as a brake to prevent an object from falling, while still allowing an operator to raise or lower the object. The selection of gear ratios, as well as a pawl, are known in the art and may be specified in such a manner that anchor 22" is designed to meet the needs of a variety of scenarios. It will be appreciated that sprockets and a connecting chain equivalently may be substituted for the series of gears.

Figure 10:
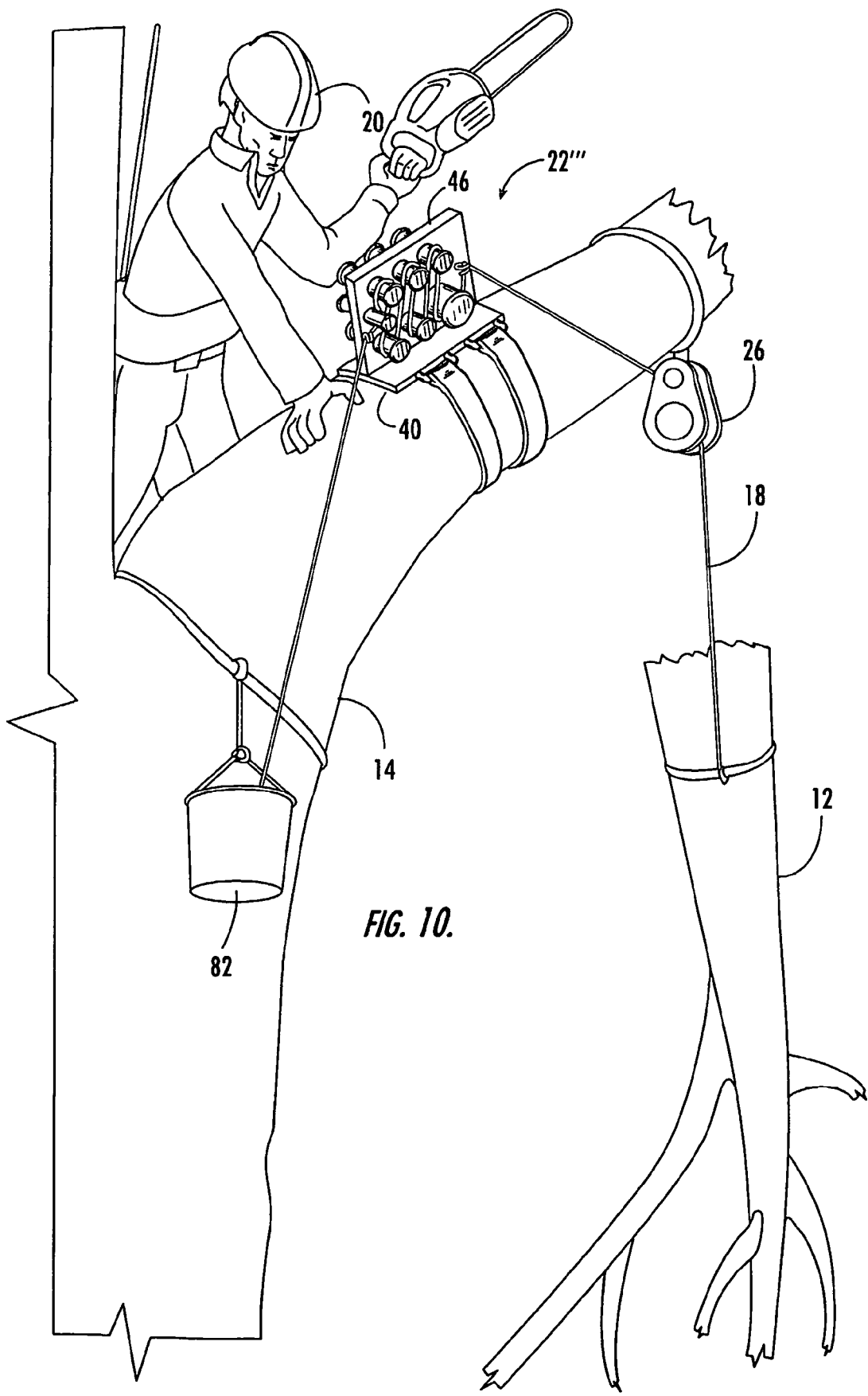
FIG. 10 illustrates another system of the present invention for lowering a severed portion of a tree to the ground, wherein the system includes yet another alternative anchor.

Turning now to FIG. 10, an alternative anchor 22''' is shown mounted to the tree 14 by the climber 20 near the portion 12. A pulley 26 is mounted as close as practicable to the portion 12 so that there will not be a sudden force on the anchor 22''' as the portion initially falls after being cut. A bucket 82 is attached to tree 14 by a rope and is used to contain the lowering line 18 so that the end of the lowering line that is not attached to portion 12 does not hang down and become entangled with the severed portion as it is lowered by climber 20. Anchor 22''' differs from anchors 22 of FIG. 4 only in that the distribution plate 46 is fixedly secured against movement to the support plate 40. No hinge mechanism 48 is provided.

In view of the foregoing detailed description of preferred embodiments of the present invention, it readily will be understood by those persons skilled in the art that the present invention is susceptible of broad utility and application. While various aspects have been described in the context of arborist uses, the aspects may be useful in other contexts as well. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A method of lowering to the ground a first portion of a tree, including the steps of:
   a. securing one end of a line to the first portion of the tree;
   b. securing an anchor against movement relative to another portion of the tree;
   c. guiding an intermediate length of the line around each one of an arrangement of guiding protuberances of the anchor for support of the first portion of the tree once severed, each guiding protuberance including a bearing surface frictionally engaging and redirecting the line without the line fully encompassing in frictional engagement the guiding protuberance, the intermediate length of the line being guided around consecutive guiding protuberances of the arrangement in alternating clockwise and counterclockwise directions so as to prevent twisting of the line about a longitudinal axis thereof as a result of said guiding step;
   d. severing the first portion of the tree; and
   e. controlling passing of the line through the arrangement of the guiding protuberances.

* * * * *